US011026206B2

(12) United States Patent
Lekutai

(10) Patent No.: US 11,026,206 B2
(45) Date of Patent: *Jun. 1, 2021

(54) EXTENDING COMMUNICATION CAPABILITIES OF A VEHICLE

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,717

(22) Filed: Jul. 21, 2020

(65) Prior Publication Data

US 2021/0105735 A1 Apr. 8, 2021

Related U.S. Application Data

(63) Continuation of application No. 16/592,311, filed on Oct. 3, 2019, now Pat. No. 10,743,280.

(51) Int. Cl.
| | |
|---|---|
| *H04W 76/10* | (2018.01) |
| *H04L 12/40* | (2006.01) |
| *H04W 60/06* | (2009.01) |
| *H04W 4/60* | (2018.01) |
| *H04W 16/18* | (2009.01) |
| *H04W 4/40* | (2018.01) |
| *H04W 68/00* | (2009.01) |
| *H04W 4/02* | (2018.01) |
| *H04W 8/18* | (2009.01) |
| *H04W 12/06* | (2021.01) |
| *H04W 4/50* | (2018.01) |
| *H04W 84/04* | (2009.01) |

(52) U.S. Cl.
CPC .......... *H04W 60/06* (2013.01); *H04W 4/023* (2013.01); *H04W 4/40* (2018.02); *H04W 4/50* (2018.02); *H04W 4/60* (2018.02); *H04W 8/18* (2013.01); *H04W 12/06* (2013.01); *H04W 16/18* (2013.01); *H04W 68/005* (2013.01); *H04W 76/10* (2018.02); *H04W 84/042* (2013.01)

(58) Field of Classification Search
CPC ......... H04W 76/10; H04L 12/40; H04L 67/16
See application file for complete search history.

(56) References Cited

U.S. PATENT DOCUMENTS

| | | |
|---|---|---|
| 9,398,454 B1 | 7/2016 | Burcham et al. |
| 9,569,403 B2 | 2/2017 | Petersen et al. |

(Continued)

FOREIGN PATENT DOCUMENTS

WO WO2012142337 A1 * 10/2012

OTHER PUBLICATIONS

Design of oneM2M-Based Fog Computing Architecture by Sendren Sheng-Dong Xu; Chun-Huang Chen; Teng-Chang Chang Published in: IEEE Internet of Things Journal (vol. 6, Issue: 6, Dec. 2019) (Year: 2019).*

(Continued)

*Primary Examiner* — William D Cumming
(74) *Attorney, Agent, or Firm* — Lee & Hayes, P.C.

(57) ABSTRACT

Systems and methods for extending communication capabilities of a vehicle. The systems and methods enable a user equipment to facilitate communication between a vehicle and a central system, adding the vehicle as a node in the system.

20 Claims, 5 Drawing Sheets

(56) References Cited

U.S. PATENT DOCUMENTS

| | | |
|---|---|---|
| 10,200,849 B1 | 2/2019 | Heide |
| 10,489,132 B1 | 11/2019 | Bloomcamp et al. |
| 10,743,280 B1 * | 8/2020 | Lekutai ................. H04W 76/10 |
| 2006/0293850 A1 | 12/2006 | Ahn et al. |
| 2019/0149956 A1 | 5/2019 | Chiang et al. |
| 2019/0266644 A1 | 8/2019 | Cho et al. |
| 2020/0213287 A1 * | 7/2020 | Zhang ..................... H04L 12/40 |
| 2020/0228948 A1 * | 7/2020 | Watfa ...................... H04L 67/16 |

OTHER PUBLICATIONS

Office Action for U.S. Appl. No. 16/592,311, dated Jan. 15, 2020, Lekutai, "Extending Communication Capabilities of a Vehicle", 14 Pages.

\* cited by examiner

EXTENDING COMMUNICATION CAPABILITIES OF A VEHICLE

CROSS REFERENCE TO RELATED APPLICATIONS

This is a continuation application which claims priority to commonly assigned, co-pending U.S. patent application Ser. No. 16/592,311, filed Oct. 3, 2019. Application Ser. No. 16/592,311 is fully incorporated herein by reference

BACKGROUND

The use of on-demand vehicles continues to rise. These vehicles, often called "ride share" vehicles, are used in a way such that a user hails the vehicle using an application on their phone or through an Internet website. The vehicle, driven by a human or driven autonomously, arrives at the location and time requested by the user. Because of their increased use, users often desire to have the vehicles more personalized to their taste, such as seat position, radio station, cabin temperature, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
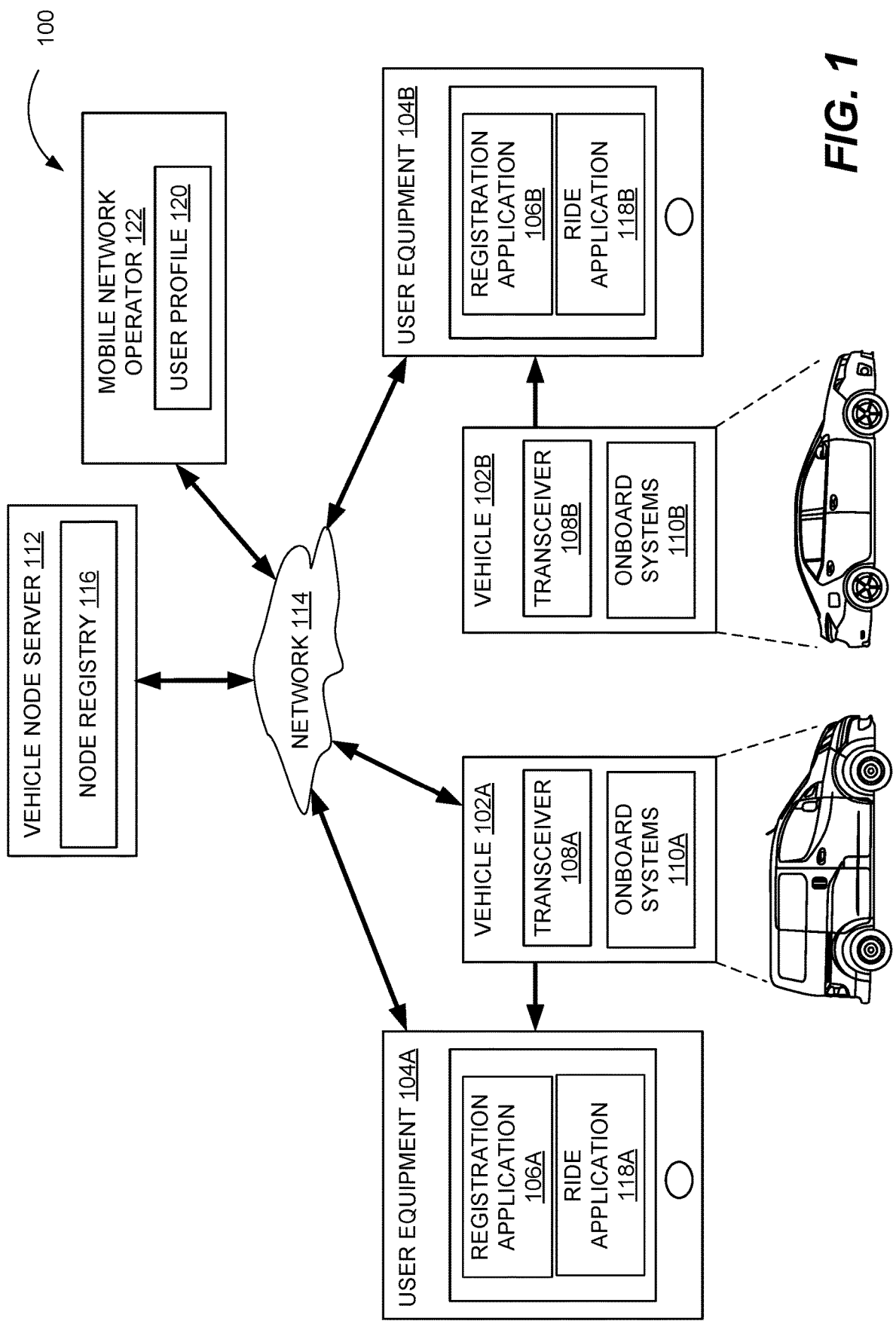
FIG. 1 depicts a system for extending the communications capabilities of a vehicle, in accordance with some examples of the present disclosure.

Examples of the present disclosure can comprise systems and methods for extending communication capabilities of a vehicle. In some examples of the presently disclosed subject matter, a vehicle is placed in communication with a vehicle node system using a mobile device of a user of the vehicle. Once a user initiates communication with the vehicle using a registration application, the vehicle is added as a component of the vehicle node system.

In some examples, a user initiates a registration application to select a vehicle for use. For example, the vehicle may be used as part of a ride-share service or may be an autonomous vehicle. In other examples, the vehicle may be a personal vehicle owned by the user or another person or entity. Once selected, if the vehicle is capable of communicating with a mobile device, the user will be presented with an option to register the vehicle in a vehicle node system.

When registered, data from and to the vehicle is transmitted using a mobile device acting as a node in the system. The registration application of the mobile device establishes a data communication channel between the vehicle and the vehicle node server. The vehicle node server uses the data transmitted using the registration application to monitor the vehicle as well as coordinate the actions of the vehicle with the user and other nodes in the system. In this manner, the use of the registration application to open a data communication channel integrates the vehicle into a communication and control network.

Using user equipment, such as a mobile device, to provide the means for transferring data can also be beneficial in various ways. For example, if the user equipment is not being used in conjunction with the vehicle, such as after a ride or before the vehicle is hailed, the vehicle may not need to be a node for a vehicle node server, thereby reducing computing resources required to track vehicles, including those not in service. In this manner, the system is self-adjusting using the user equipment as the input to provide for the adjustment.

The systems and methods discussed herein are discussed generally with respect to cellular UEs, tablets, computers, and the like, and in terms of components (e.g., network entities) associated with Wi-Fi networks, BLUETOOTH networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

As shown in FIG. 1, examples of the present disclosure can comprise a system 100 used to extend communication capabilities of vehicles. In some examples, the system 100 is configured to allow the registration of vehicles, such as vehicle 102A and vehicle 102B as a component of the system 100. To register the vehicle 102A as a component of the system 100, user equipment 104A, which in this example is a mobile device, includes a registration application 106A. It should be noted that the following description relating to the user equipment 104A and the vehicle 102A also apply to the user equipment 104B and the vehicle 102B, as well as similarly numbers items. The registration application 106A communicates with the vehicle 102A using a transceiver 108A installed in the vehicle 102A. The transceiver 108A can be comprised of various technologies, including a radio frequency transceiver, a BLUETOOTH® transceiver, a near field transceiver, or other communication technologies compatible with the user equipment 104A.

The transceiver 108A transmits data, control commands, and the like, from and to the onboard systems 110A of the vehicle 102A to the user equipment 104. The onboard systems 110A may vary from vehicle to vehicle, but may include systems such as throttle control, steering, temperature control, braking, audio controls, climate controls, seat controls, and the like. The onboard systems 110A may also include data such as cabin temperature, speed, location, audio channel and volume, seat positions, and the like. The presently disclosed subject matter is not limited to any particular type of onboard systems 110A.

The registration application 106A is used to register the vehicle 102A with a vehicle node server 112. The vehicle node server 112 receives communications through a network 114, which may be a cellular network, a WiFi network, or other various types of network. The vehicle node server 112 acts as the central communication hub that coordinates communications between various entities in the system 100. The vehicle node server 112 includes a node registry 116 that maintains a listing of all active and inactive nodes registered in the system 100. In some examples, the node registry 116 may also include a listing of all inactive nodes that were previously registered as active nodes but, for various reasons, are now currently inactive. For example, the vehicle 102A may have previously been registered as an active node in the node registry 116, but after the end of a ride provided to a user, the user may have deactivated the vehicle 102A. In this example, because the vehicle 102A was previously registered as a node and saved as an active node in the node registry 116, if the vehicle is being registered again, authentication procedures used to register the vehicle 102A may be abbreviated or eliminated in some examples.

As used herein, a "node" is a device, component, or function that receives, sends, or processes data in the system. Thus, as used herein, the user equipment 104A and 104B, as well as the vehicle 102A and 102B, may be considered "nodes" in the system. In use, the vehicle node server 112 establishes various nodes in order to manage and coordinate communication between the various entities in the system. Because in some examples the presence of a vehicle in the system is temporary, the use of nodes as a means to coordinate the integration and de-integration of the vehicles in the system 100 can be useful.

During use, the vehicle(s) 102A and/or 102B can be registered as nodes in the system 100 through the use of the registration application 106A and/or 106B, respectively. In the example of a ride-share vehicle, including an autonomous vehicle, a user (not shown) may initiate a ride application 118A to hail a ride from a ride-share service. As used herein, a "ride-share" service is a third-party service that provides a vehicle for use for others. The vehicle can be owned by the third-party or may be owned by individuals that are providers of the third-party. Further, being a third-party does not exclude parties such as a mobile network operator from providing the vehicle. It should be noted that the presently disclosed subject matter is not limited to third-party vehicles, as various aspects of the presently disclosed subject matter may be used in vehicles such as personal vehicles. The ride application 118A is used to hail a ride for a specific time or location. A vehicle is selected and sent to the designated place and time. The vehicle, such as the vehicle 102A, is either driven by a human pilot or an autopilot (such as with autonomous vehicles).

When the vehicle 102A is hailed using the ride application 118A, in some examples, the vehicle 102A may be capable of communicating with the user equipment 104A using the transceiver 108A. It should be noted that the transceiver 108A may be a wired or wireless transceiver. If so configured and capable, the user will be informed through the registration application 106A, or other available application such as the ride application 118A, that the vehicle 102A is en route and/or capable of being integrated into the system 100 as a node for the vehicle node server 112.

In the present example, the user equipment 104A and/or 104B are used to provide a communication pathway between the vehicle 102A/102B and the vehicle node server 112. The use of the user equipment 104A/104B extends communication capabilities of the vehicle 102A/102B by using the cellular capabilities of the user equipment 104A/104B. As described in more detail below, once the vehicle 102A/102B is identified and registered as a node, the user equipment 104A/104B can be used to establish a data channel between the vehicle 102A/102B and the vehicle node server 112. A user profile 120 created when a user subscribes to the services of a mobile network operator 122 can be uploaded to the vehicle 102A and may be used to configure the vehicle 102A. For example, the user profile 120 may include information about the user such as a preferred cabin temperature, music station, seating position, and the like. It should be noted that the vehicle node server 112 may be operated by the mobile network operator 122 or another entity. The presently disclosed subject matter is not limited to any particular entity operating the vehicle node server 112.

As discussed above, the types of data transferred in a data flow using the data channel may vary. In some examples, the data flow may be a vehicle 102A setting, a vehicle 102A condition, a location of the vehicle 102A, a location of the vehicle 102A in relation to the vehicle 102B, or a navigational landmark. Conditions of the vehicle may include, but are not limited to, fully operational, updated on maintenance, fueled to a particular level, and the like. In some examples, a navigational landmark may be used to further define the location of the vehicle, for example, in highly congested areas or in areas in which a Global Positioning System location may not be accurate or available. In further examples, the data flow may include an emergency brake warning, traffic avoidance information, directional assistance, lane change assistance, or speed assistance. For example, the vehicle 102A may be registered with the vehicle node server 112 using the registration application 106A and the vehicle 102B may be registered with the vehicle node server 112 using the registration application 106B.

In an example, Global Positioning System (GPS) data from the user equipment 104A and the user equipment 104B may be used by the vehicle node server 112 to help navigate the vehicle 102A and 102B, respectively. The vehicle node server 112 may detect a condition, such as an emergency condition, based on the speed, location, or heading of the vehicle 102A using data received from the vehicle 102B and communicate a notification or command in response to the data, such as an emergency braking operation or instructing the vehicle 102A to take an alternate route. In this example, the vehicle node server 112 can update a configuration associated with the vehicle 102A based on data received from the vehicle 102B using the data channel provided by their respective user equipment 104A and 104B.

The data channel opened using the registration application 106A or 106B may be of various forms. For example, the data channel may be the data channel used by cellular networks, such as the network 114, to provide data. The data can be streaming, whereby the data channel remains active (in a manner similar to streaming media). The data channel may also be an intermittent channel, whereby data is transmitted when a condition is met, such as a required change in navigational instructions. The data channel may also be a timed transmission in which data is transmitted in packets rather than maintaining an open and active data channel. In some examples, the type of connection may vary, such as changing from a constant on channel (e.g. streaming) to an intermittent channel. It should be noted that the presently disclosed subject matter is not limited to any particular type of channel, as other types of communications may be used, such as voice, SMS, and the like.

Figure 2A:
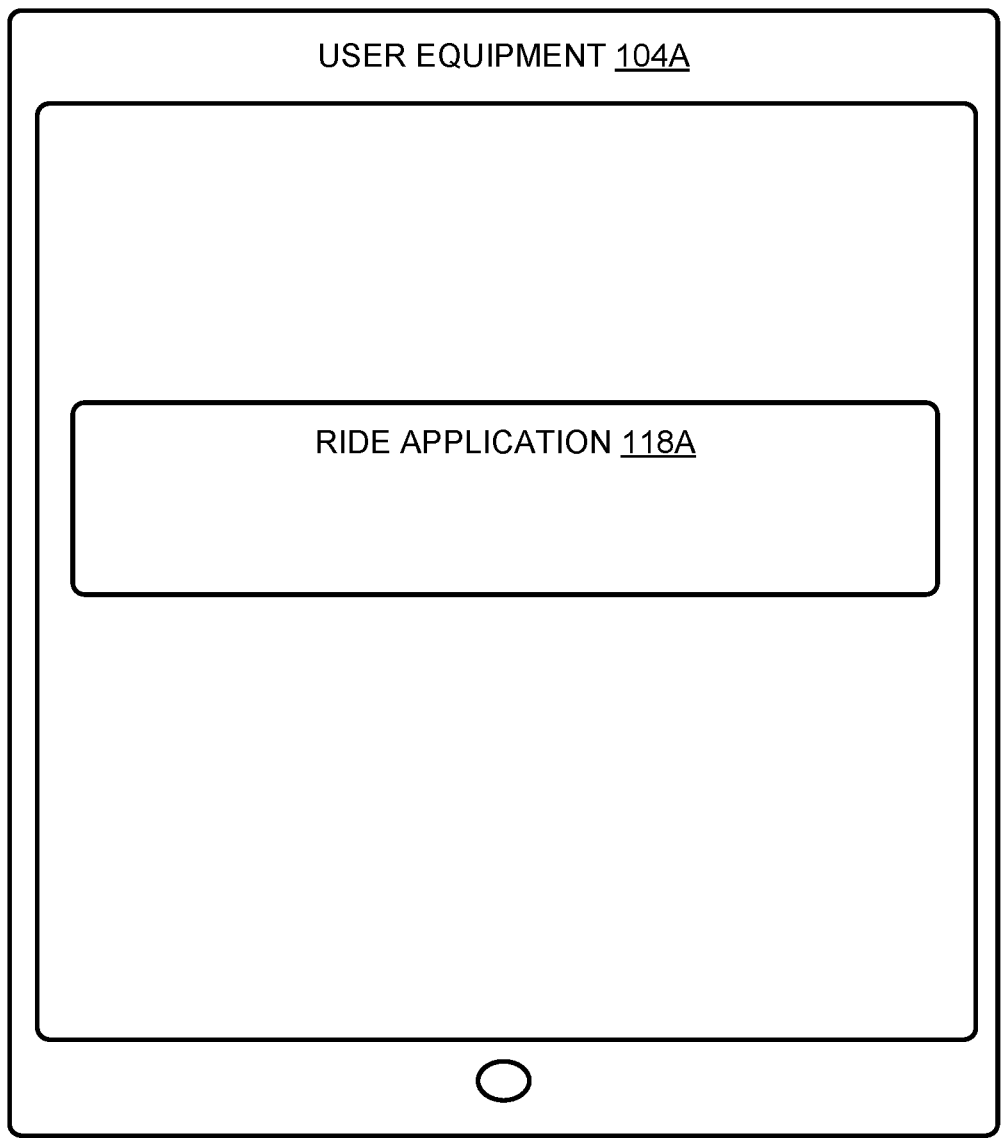
FIGS. 2A and 2B are user interfaces that may be used to register a vehicle as a node in a vehicle node server, in accordance with some examples of the present disclosure.
Figure 2B:
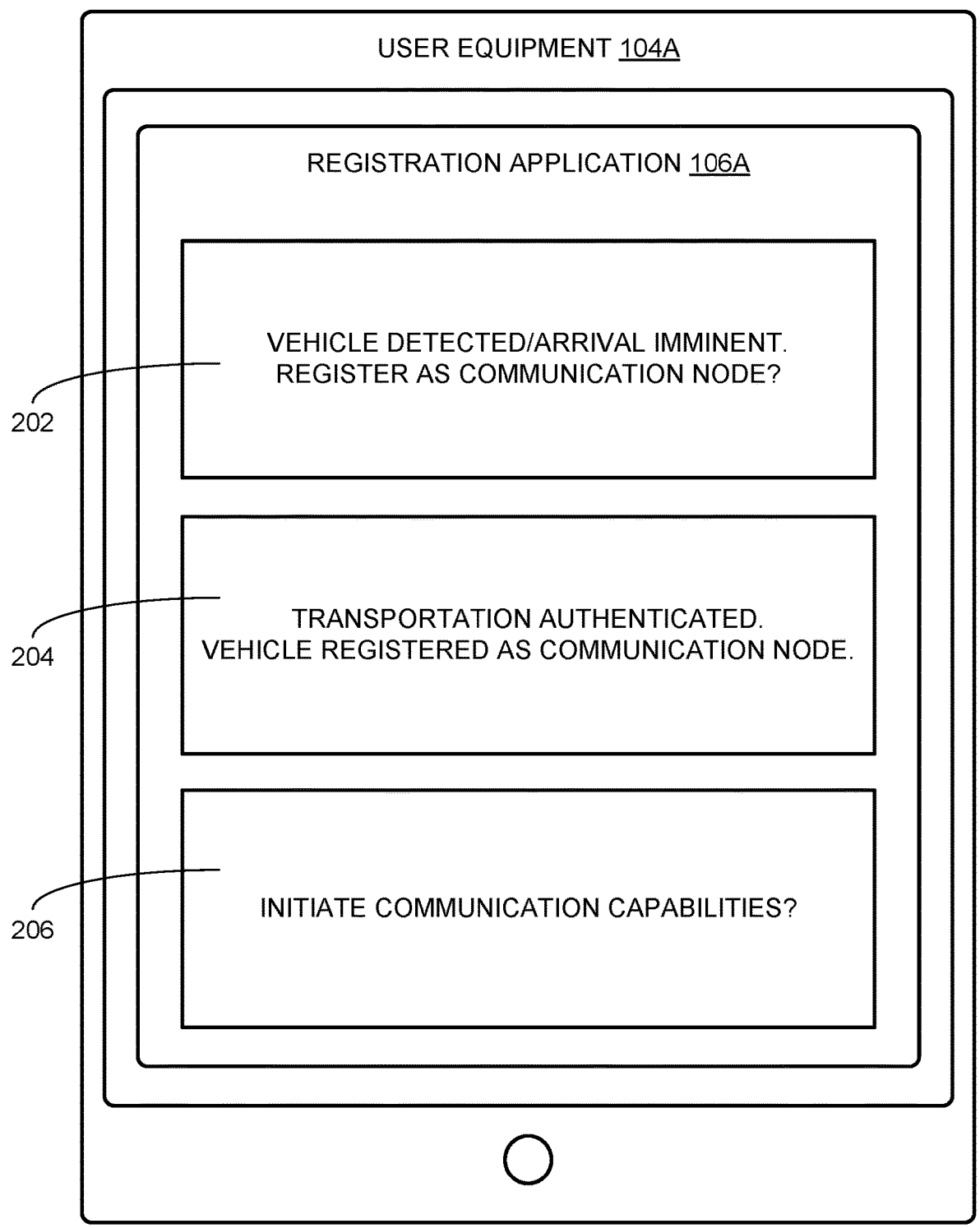

FIGS. 2A and 2B are user interfaces that may be used to register a vehicle, such as the vehicle 102A or 102B, as a node in the vehicle node server 112. In FIG. 2A, the user equipment 104A renders the ride application 118A. The ride application 118A is an application that, when used, hails a vehicle, such as the vehicle 102A, to a location and time input by a user using the ride application 118.

Once the ride application 118A has been used to hail the vehicle 102A, the user equipment 104A renders various user interfaces to extend communication capabilities of the vehicle 102A. In FIG. 2B, the user equipment 104A renders the registration user interface 202. The registration user interface 202 is configured to receive a user input to register the vehicle 102A as a node in the system 100. The registration user interface 202, in the example illustrated in FIG. 2B, is rendered when the vehicle 102A is detected at a location proximate to the user or the location at which the vehicle is to be used. In some examples, the registration user interface 202 may be rendered upon the hailing of the vehicle 102A. The presently disclosed subject matter is not limited to any time or location at which the registration user interface 202 may be rendered.

Upon receiving an input at the registration user interface 202, in the example illustrated in FIG. 2B, the vehicle 102A is entered into an identification and authentication process. The manner in which the vehicle 102 is authenticated may vary from application to application. For example, the identification of the vehicle 102A may be pre-registered with the mobile network operator 122. In some examples, the vehicle 102A transmits data to the vehicle node server 112, or other service, to be identified and authenticated, indicated by authentication indication 204. In other examples, the vehicle 102A may be used as a node without an identification and/or authentication process. For example, if the vehicle 102A is detected to be proximate to a user or the user equipment 104A, the vehicle 102A may be added as a node. Once authenticated, the initiate communications interface 206 is rendered. When the initiate communications interface 206 detects a selection input, the registration application 106A causes the user equipment 104A to commence communication with the vehicle 102A and open a data channel to the vehicle node server 112 through the network 114.

Figure 3:
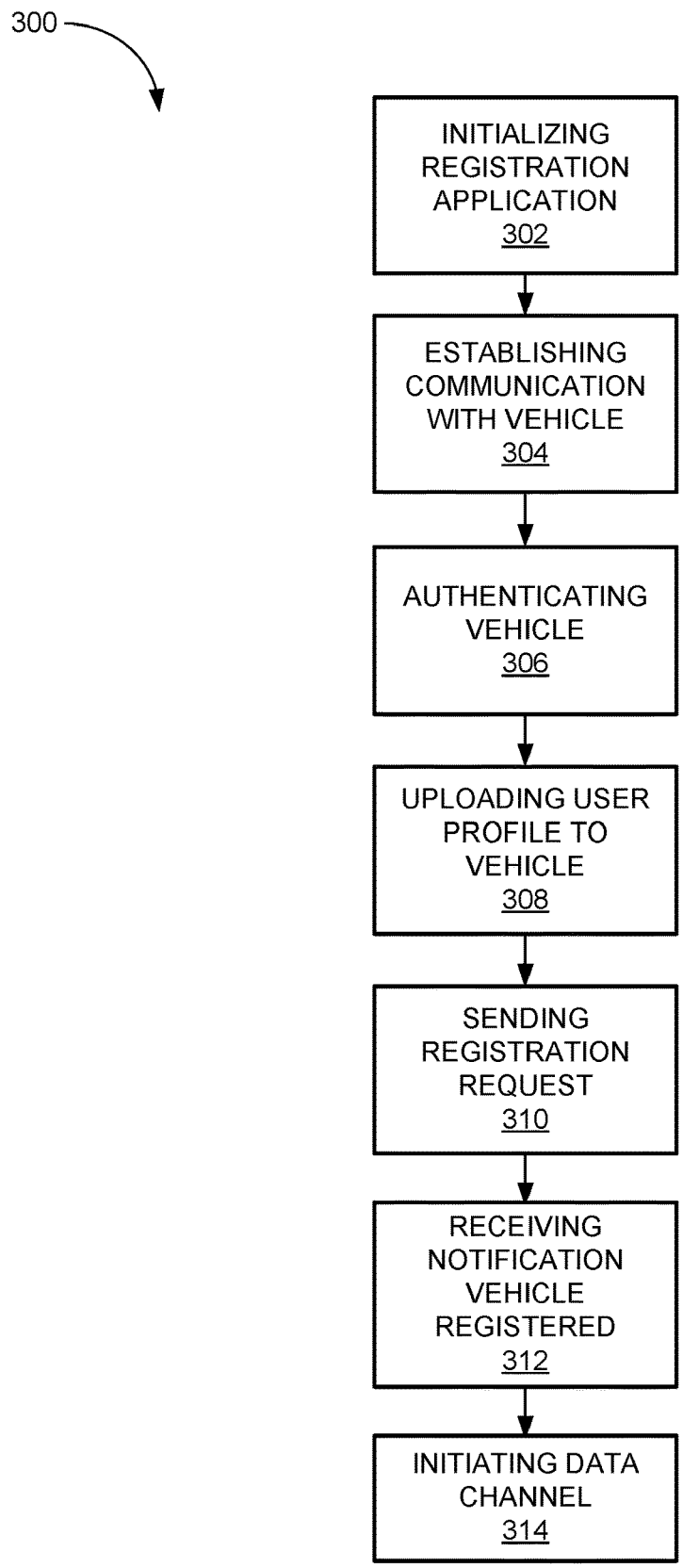
FIG. 3 is an illustrative process for extending communication capabilities of a vehicle, in accordance with some examples of the present disclosure.

FIG. 3 is an illustrative process 300 for extending communication capabilities of a vehicle, such as the vehicle 102A. The process and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

As discussed above, when hailing a vehicle, including an autonomous or ride-share vehicle, it may be beneficial to use a user equipment (such as a mobile phone) to create a data pathway between the vehicle and a central service, such as the mobile network operator 122 or the vehicle node server 112. Communicatively connecting the vehicle 102A with the mobile network operator 122 can provide for various benefits. For example, the user profile 120 may be uploaded to the vehicle 102A to create a personalized riding experience. Further, because of the ubiquitous nature of many cellular networks, adding the vehicle 102A as a node and coordinating the movement of the vehicle 102A with other vehicles, such as the vehicle 102B, using a data channel provided by the user equipment 104A can, in some examples, increase ride satisfaction, safety, and the like. Using the user equipment 104A to provide the means for transferring data can also be beneficial in various ways. For example, if the user equipment 104A is not being used in conjunction with the vehicle 102A, such as after a ride or before the vehicle is hailed, the vehicle 102A does not need to be a node for vehicle node server, thereby reducing computing resources required to track vehicles, including those not in service. In this manner, the system 100 is self-adjusting using the user equipment 104A or 104B as the input to provide for the adjustment.

Referring to FIG. 3, the process 300 commences at operation 302, where the registration application 106A is initialized. In some examples, the registration application 106A is initialized in response to the hailing of a vehicle. In one example, the ride application 118A may be used to hail the vehicle 102A. In other examples, the registration application 106A may be initialized in response to the detection of the user equipment 104A proximate to the vehicle 102A if the vehicle 102A is configurable to communicate with the user equipment 104A. For example, a user may hail a cab or a vehicle with the use of the ride application 118A. The user equipment 104A may receive an input that the vehicle 102A is capable of being added as a node to the vehicle node server 112. This input may be transmitted by the vehicle 102A, may be detected by the user equipment 104A, or received in other manners. The presently disclosed subject matter is not limited to any particular manner in which the registration application 106A is initiated.

Initiating the registration application 106A can commence various processes. For example, initializing the registration application 106A may communicatively connect the user equipment 104A to the vehicle node server 112, informing the vehicle node server 112 that the user equipment 104A will be commencing a registration operation for the vehicle 102A. If the vehicle 102A was previously registered, the vehicle node server 112 may proceed and register the vehicle 102A as a node and not require other operations of process 300.

The process 300 continues to operation 304, where communications with the vehicle 102A is established. The communications with the vehicle 102A may be between the vehicle node server 112 and the vehicle 102A if the vehicle 102A is capable of communicating using the network 114. In other examples, the communication between the vehicle node server 112 and the vehicle 102A may use the user equipment 104A. In other examples, if the vehicle 102A is in communication with a third-party service (such as a ride sharing service), the vehicle node server 112 may establish communications with the third-party service.

The process 300 continues to operation 306, where the vehicle 102A is authenticated. In some examples, the authentication operation may have been conducted previously. In some examples, the vehicle 102A is authenticated to ensure that the vehicle 102A that is being added as anode is the intended vehicle. For example, two individuals may have hailed a vehicle for the same location and time. The authentication process verifies which of the vehicles proximate to the user intending to register the vehicle 102A is the correct vehicle. The vehicle 102A may be authenticated using various forms of identification, including a picture of the license plate, information transmitted by the vehicle's 102A onboard computer, and the like. The presently disclosed subject matter is not limited to any particular form of information used to authenticate the vehicle 102A.

The process 300 continues to operation 308, where the user profile 120 is uploaded to the vehicle 102A. In examples where the vehicle 102A is capable of being configurable according to various parameters stored in the user profile 120, the vehicle 102A may use the user profile 120 to configure the vehicle 102A. In other examples, the user profile 120 may be used to verify the user entering the vehicle. For example, the user profile 120 may indicate to the vehicle 102A that the user using the vehicle 102A has a user equipment 104A with specific identifying information. In this manner, the user may be assured that the correct vehicle 102A has arrived and the vehicle 102A (or the driver if not an autonomous vehicle) may be assured that the passenger entering the vehicle 102A is the correct passenger.

The process 300 continues to operation 310, where the registration request from registration application 106A is transmitted to the vehicle node server 112. In some examples, it may be beneficial to send the registration request after the vehicle 102A and/or the user is authenticated to reduce the number of potentially incorrect or malicious registration requests.

The process 300 continues to operation 312, where the user equipment 104A and/or the vehicle 102A receives a notification that the vehicle 102A is registered as a node.

The process 300 continues to operation 314, where a data channel to provide for a data flow is initiated, allowing the user equipment 104A to facilitate data communications between the vehicle 102A and the vehicle node server 112. In some examples, the process 300 can include an operation to de-register the vehicle 102A upon notification that the ride has been completed. The completion of the ride may include, but is not limited to, an arrival at a pre-determined destination, or, when an occupant exits the vehicle 102A. The de-registration removes the vehicle 102A as an active node. The notification can be received in various manners, including an input by a user, payment to the ride-share company indicating the service is complete, and other manners. The process 300 thereafter ends.

Figure 4:
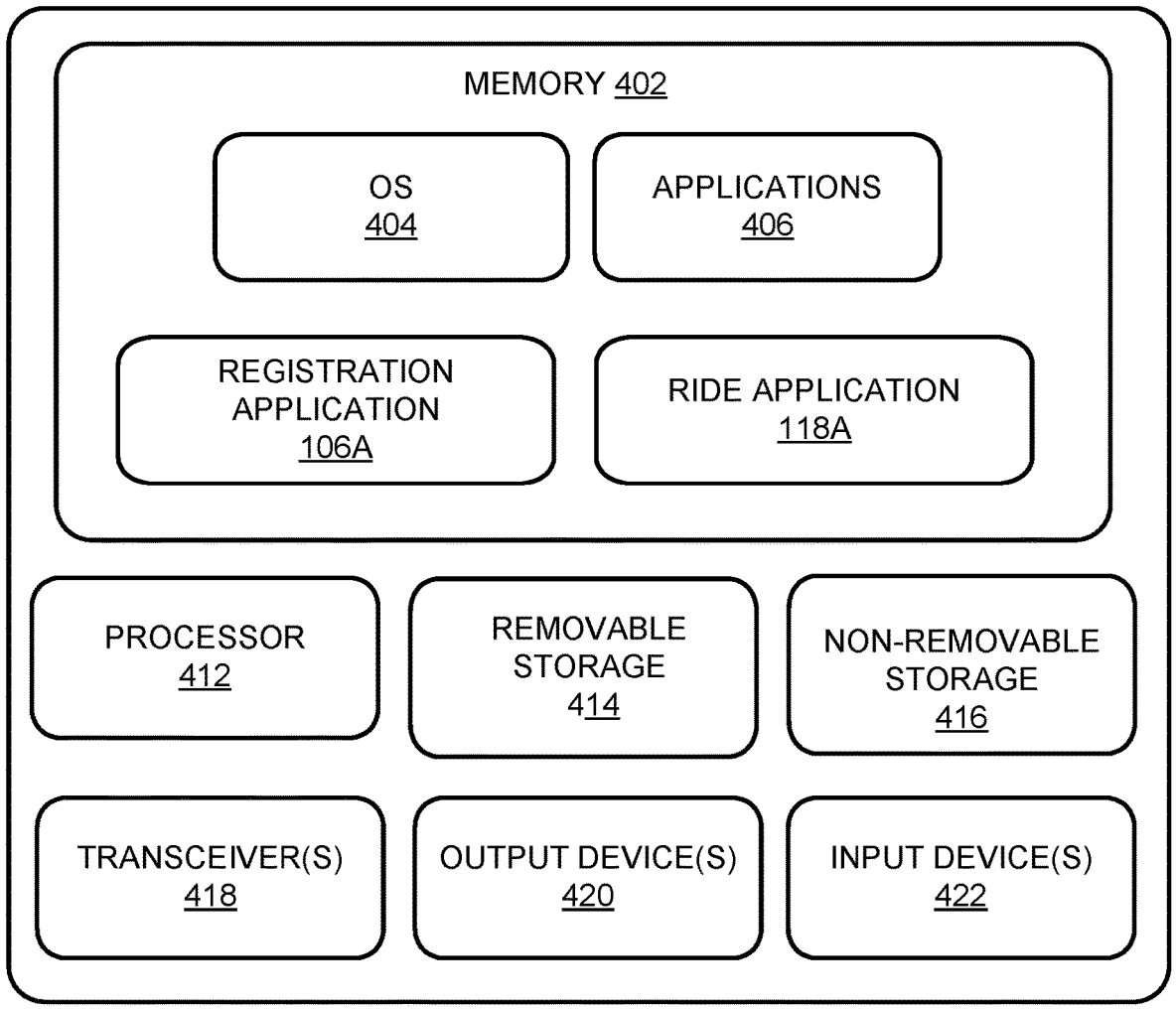
FIG. 4 depicts a component level view of an endpoint for use with the systems and methods described herein, in accordance with some examples of the present disclosure.

FIG. 4 depicts a component level view of the user equipment 104A for use with the systems and methods described herein. The user equipment 104A could be any device capable of communicating using the network 114. The user equipment 104A can comprise several components to execute the above-mentioned functions. As discussed below, the user equipment 104A can comprise memory 402 including an operating system (OS) 404 and one or more standard applications 406. The standard applications 406 can include many features common to user equipment such as, for example, applications initiated using voice commands (such as Internet searches, home appliance controls, and the like), music player, Internet radio, and other such applications. In this case, the standard applications 406 can also comprise a video call application, an audio call application, and a messaging application to enable users to engage in audio calls, video calls, and messaging, among other things. The standard applications 406 can also include contacts to enable the user to select a contact to initiate, for example, a video call, audio call, text message, etc.

The user equipment 104A can also comprise the registration application 106A and the ride application 118A. As mentioned above, the registration application 106A is an application that, when an input is received, initiates the registration operation of the vehicle 102A as well as instructing the user equipment 104A to open a data channel between the vehicle 102A, the user equipment 104A and the network 114. The ride application 118A is an application designed to hail a vehicle for use by a user.

The user equipment 104A can also comprise one or more processors 412 and one or more of removable storage 414, non-removable storage 416, transceiver(s) 418, output device(s) 420, and input device(s) 422. In various implementations, the memory 402 can be volatile (such as random access memory (RAM)), non-volatile (such as read only memory (ROM), flash memory, etc.), or some combination of the two. The memory 402 can include all, or part, of the registration application 106A and/or the ride application 118A. In some examples, rather than being stored in the memory 402, some, or all, of the registration application 106A and/or the ride application 118A, and other information, can be stored on a remote server or a cloud of servers accessible by the user equipment 104A.

The memory 402 can also include the OS 404. The OS 404 varies depending on the manufacturer of the user equipment 104A. The OS 404 contains the modules and software that support basic functions of the user equipment 104A, such as scheduling tasks, executing applications, and controlling peripherals. In some examples, the OS 404 can enable the registration application 106A and/or the ride application 118A, and provide other functions, as described above, via the transceiver(s) 418. The OS 404 can also enable the user equipment 104A to send and retrieve other data and perform other functions using the registration application 106A.

The user equipment 104A can also comprise one or more processors 412. In some implementations, the processor(s) 412 can be one or more central processing units (CPUs), graphics processing units (GPUs), both CPU and GPU, or any other processing unit. The user equipment 104A may also include additional data storage devices (removable and/or non-removable) such as, for example, magnetic disks, optical disks, or tape. Such additional storage is illustrated in FIG. 4 by removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the user equipment 104A. Any such non-transitory computer-readable media may be part of the user equipment 104A or may be a separate database, databank, remote server, or cloud-based server.

In some implementations, the transceiver(s) 418 include any transceivers known in the art. In some examples, the transceiver(s) 418 can include wireless modem(s) to facilitate wireless connectivity with other components (e.g., between the user equipment 104A and a wireless modem that is a gateway to the Internet), the Internet, and/or an intranet. Specifically, the transceiver(s) 418 can include one or more transceivers that can enable the user equipment 104A to send and receive data from the vehicle 102A, video calls, audio calls, and messages and to perform other functions. Thus, the transceiver(s) 418 can include multiple single-channel transceivers or a multi-frequency, multi-channel transceiver to enable the user equipment 104A to send and receive video calls, audio calls, messaging, etc. The transceiver(s) 418 can enable the user equipment 104A to connect to multiple networks including, but not limited to 2G, 3G, 4G, 5G, and Wi-Fi networks. The transceiver(s) can also include one or more transceivers to enable the user equipment 104A to connect to future (e.g., 6G) networks, Internet-of-Things (IoT), machine-to machine (M2M), and other current and future networks.

The transceiver(s) 418 may also include one or more radio transceivers that perform the function of transmitting and receiving radio frequency communications via an antenna (e.g., Wi-Fi or BLUETOOTH®). In other examples, the transceiver(s) 418 may include wired communication components, such as a wired modem or Ethernet port, for communicating via one or more wired networks. The transceiver(s) 418 can enable the user equipment 104A to make audio and video calls, download files, access web applications, and provide other communications associated with the systems and methods, described above.

In some implementations, the output device(s) 420 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 420 can also include speakers, or similar devices, to play sounds or ringtones when an audio call or video call is received. Output device(s) 420 can also include ports for one or more peripheral devices, such as headphones, peripheral speakers, or a peripheral display.

In various implementations, input device(s) 422 include any input devices known in the art. For example, the input device(s) 422 may include a camera, a microphone, or a keyboard/keypad. The input device(s) 422 can include a touch-sensitive display or a keyboard to enable users to enter data and make requests and receive responses via web applications (e.g., in a web browser), make audio and video calls, and use the standard applications 406, among other things. In some examples, the input device(s) 422 may be a communication cable connected between the user equipment 104A and an output/input of the vehicle 102A such that communications between the user equipment 104A and the vehicle 102A is a wired connection. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 422 and an output device 420.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
   a memory storing computer-executable instructions; and
   a processor in communication with the memory, the computer-executable instructions causing the processor to perform acts comprising:
   sending a request to a mobile network with which a mobile device is in communication to register a vehicle as an endpoint on a vehicle node server;
   receiving a notification that the vehicle is registered on the vehicle node server;
   initializing a data channel between the vehicle and the vehicle node server based on the notification; and
   transmitting data to the vehicle node server based at least in part on the data channel.

2. The system of claim 1, the acts further comprising transmitting a user profile comprising the data, which is associated with the vehicle, to the vehicle node server based at least in part on the mobile device initializing the data channel.

3. The system of claim 1, the acts further comprising receiving second data via the data channel, the second data comprising at least one of:
   vehicle setting data;
   vehicle condition data;
   vehicle location data;
   a location of the vehicle in relation to a second vehicle; or
   a navigational landmark.

4. The system of claim 1, the acts further comprising receiving second data via the data channel, the second data comprising at least one of:
   an emergency brake warning;
   traffic avoidance information;
   directional assistance;
   lane change assistance; or
   speed assistance.

5. The system of claim 1, the acts further comprising:
   transmitting a user profile to the vehicle node server based at least in part on the data channel; and
   causing configuration of the vehicle based at least in part on the user profile.

6. The system of claim 1, the acts further comprising receiving an updated vehicle configuration based on second data provided by at least a second vehicle registered as a node in the vehicle node server.

7. The system of claim 1, the acts further comprising de-registering the vehicle as a node upon completion of a ride.

8. A method comprising:
   sending a request to a mobile network with which a mobile device is in communication to register a vehicle as an endpoint on a vehicle node server;
   receiving a notification that the vehicle is registered on the vehicle node server;
   initializing a data channel between the vehicle and the vehicle node server based on the notification; and
   transmitting data to the vehicle node server based at least in part on the data channel.

9. The method of claim 8, further comprising transmitting a user profile comprising the data, which is associated with the vehicle, to the vehicle node server based at least in part on the mobile device initializing the data channel.

10. The method of claim 8, further comprising receiving second data via the data channel, the second data comprising at least one of:
    vehicle setting data;
    vehicle condition data;
    vehicle location data;
    a location of the vehicle in relation to a second vehicle; or
    a navigational landmark.

11. The method of claim 8, further comprising receiving second data via the data channel, the second data comprising at least one of:

an emergency brake warning;
traffic avoidance information;
directional assistance;
lane change assistance; or
speed assistance.

12. The method of claim 8, further comprising:
transmitting a user profile to the vehicle node server based at least in part on the data channel; and
causing configuration of the vehicle based at least in part on the user profile.

13. The method of claim 8, further comprising receiving an updated vehicle configuration based on second data provided by at least a second vehicle registered as a node in the vehicle node server.

14. The method of claim 8, further comprising de-registering the vehicle as a node upon completion of a ride.

15. A user equipment (UE) comprising:
a transceiver to send and receive at least one of wired or wireless transmissions;
memory storing computer-executable instructions including at least a ride application and a registration application; and
a processor in communication with at least the transceiver and the memory, the computer-executable instructions causing the processor to perform acts comprising:
sending a request to a mobile network with which a mobile device is in communication to register a vehicle as an endpoint on a vehicle node server;
receiving a notification that the vehicle is registered on the vehicle node server;
initializing a data channel between the vehicle and the vehicle node server based on the notification; and
transmitting data to the vehicle node server based at least in part on the data channel.

16. The UE of claim 15, the acts further comprising transmitting a user profile comprising the data, which is associated with the vehicle, to the vehicle node server based at least in part on the mobile device initializing the data channel.

17. The UE of claim 15, the acts further comprising receiving second data via the data channel, the second data comprising at least one of:
vehicle setting data;
vehicle condition data;
vehicle location data;
a location of the vehicle in relation to a second vehicle; or
a navigational landmark.

18. The UE of claim 15, the acts further comprising receiving second data via the data channel, the second data comprising at least one of:
an emergency brake warning;
traffic avoidance information;
directional assistance;
lane change assistance; or
speed assistance.

19. The UE of claim 15, the acts further comprising:
transmitting a user profile to the vehicle node server based at least in part on the data channel; and
causing configuration of the vehicle based at least in part on the user profile.

20. The UE of claim 15, the acts further comprising receiving an updated vehicle configuration based on second data provided by at least a second vehicle registered as a node in the vehicle node server.

* * * * *